United States Patent [19]  [11] 4,395,599
Seidel  [45] Jul. 26, 1983

[54] DRIVING POINT IMPEDANCE DERIVED FROM A TRANSFER IMPEDANCE
[75] Inventor: Harold Seidel, Warren, N.J.
[73] Assignee: Bell Telephone Laboratories, Incorporated, Murray Hill, N.J.
[21] Appl. No.: 211,355
[22] Filed: Nov. 28, 1980
[51] Int. Cl.³ .............................................. H04B 1/58
[52] U.S. Cl. .............................. 179/170 NC; 333/124
[58] Field of Search .............. 333/17 M, 32, 109, 124; 179/170 D, 170 T, 170.2, 170.6, 170.8, 170 NC

[56] References Cited
U.S. PATENT DOCUMENTS
3,612,780 10/1971 Beurrier et al. .................. 179/170 T
3,919,502 11/1975 Daryanani ....................... 179/170 D
3,967,220 6/1976 Tagashira et al. ................... 333/109

Primary Examiner—Randall P. Myers
Attorney, Agent, or Firm—J. T. Peoples

[57] ABSTRACT

Circuitry for converting a transfer function characteristic into a specified driving point impedance using feed-forward techniques comprises: a directional coupler (90) having input, transmission and reflection ports; and unidirectional signal transfer means including transfer network (91) and amplifier (92) connected in cascade between the transmission and reflection ports. The impedance level of the transfer network is adjustable and is compensated for by the amplifier. A high impedance level allows for small element values for certain components such as capacitors so that a wide frequency band driving point impedance may be realized with integrated circuits. Further decrease in capacitor values is achieved utilizing capacitor magnification. The driving point impedance may be realized in balanced or unbalanced-to-ground fashion.

11 Claims, 9 Drawing Figures

DRIVING POINT IMPEDANCE DERIVED FROM A TRANSFER IMPEDANCE

BACKGROUND OF THE INVENTION

1. Field of the Invention

This invention relates generally to circuitry for providing a preselected driving point immittance and, more particularly, to frequency-sensitive driving point immittance circuitry derivable from a wideband transfer function.

2. Description of the Prior Art

In many telecommunications applications, it is necessary to couple a bidirectional two-wire line to a pair of unidirectional two-wire lines oftentimes referred to as a four-wire line. In a telephone system, for example, bidirectional signals carried over a two-wire subscriber loop are split into separate transmit and receive unidirectional signals at a subscriber terminal and a central office. A network generally utilized to effect this coupling function is called a hybrid circuit.

A conventional hybrid circuit comprises a biconjugate four-port network wherein the two unidirectional lines are connected to one set of conjugate ports and the bidirectional line and a balancing network are connected to the other set of conjugated ports. In the telephony example cited above, an impedance mismatch between the subscriber loop and the hybrid balancing network may result in a signal reflection which, in turn, can result in instability of amplifiers appearing in the system or echoes which are subjectively objectionable to the telephone users. Subscriber loops present a wide range of impedances due to numerous cable gauges which typically comprise a loop as well as the varying lengths of each gauge. Moreover, the overall length distribution of loops displays wide variation.

In the prior art, it has often been assumed that the loop impedance is relatively constant so that the hybrid network comprises only resistors. The distortion produced because of imperfect balancing can be ignored for narrowband voice signals used in standard telephony. However, for those applications requiring a high degree of balance, it has been necessary to either construct precision balancing networks which can be adjusted to match the loop impedance or to manufacture a large number of different balancing networks. In these applications, the balancing networks have been complex, expensive, rather large in size and typically require inductive elements.

In modern telephone systems, it is necessary to connect wideband digital data terminals to the various subscriber loops. The problem of matching a loop becomes particularly acute because the loop impedance is frequency sensitive over a broad frequency band. In my U.S. Pat. Nos. 4,174,470 and 4,181,824, issued Nov. 13, 1979 and Jan. 1, 1980, respectively, I disclose an electronic hybrid and an associated balancing network. The network is synthesized using frequency-sensitive RC networks to achieve a better match to a connected loop over a broad frequency range. However, the synthesis technique is of the driving point type, as contrasted to transfer immittance type, so more control parameters are needed to achieve a desired balancing network characteristic. Moreover, the individual capacitor components may be quite large and therefore the networks may not be fabricated with integrated circuits.

The disclosure of U.S. Pat. No. 3,919,502, issued to Daryanani on Nov. 11, 1975, presents a technique for realizing a driving point impedance utilizing transfer immittance synthesis. Embodiments of this technique include balancing networks in voice frequency telephone applications. Complex impedance variations can be matched more easily with a transfer impedance network, as compared to a strictly two-terminal network, because the control parameters are basically independent. Although the circuit configurations disclosed by Daryanani are useful in the voice frequency range, the configuration possess certain limitations precluding their application to wideband services. The configurations exhibit narrowband characteristics because operational amplifier circuitry with negative feedback is employed. Moreover, the high-gain negative feedback yields circuit configurations which are not inherently stable.

SUMMARY OF THE INVENTION

These and other limitations and deficiencies of the prior art are obviated, in accordance with the present invention, by an improved wideband balancing network which combines the decoupling property of a directional coupler with the versatility of a transfer function characteristic. The elements of the network providing the transfer function may be integrated since the overall transfer function can be gain adjusted through wideband amplification.

In the preferred embodiment of the present invention, the balancing network is realized with a three-port directional coupler having equal symmetric mode and antisymmetric mode transfer gains. The directional coupler is arranged so that the input port is coupled predominantly with the transmission port and the reflection port predominantly with the input port. A transfer signal circuit is directively coupled between the transmission and reflection ports. If the transfer signal circuit has an input-to-output transfer ratio of $-\beta$ and an output reference impedance $Z_R$, then the input impedance of the balancing network is of the form $(1+\beta)Z_R/(1-\beta)$. The input impedance $Z_{in}$ is realized indirectly by synthesizing $\beta$; $\beta$ is computed as $(Z_{in}-Z_R)/(Z_{in}+Z_R)$ once the desired $Z_{in}$ is known and the impedance $Z_R$ is selected.

One feature of the invention is that only feedforward is used, thereby effecting an inherently stable system. Also, because there are no feedback loops, the frequency range is extremely broadband.

These and other features and advantages will be better understood from a detailed description of an illustrative embodiment thereof, which follows, when taken in conjunction with the accompanying drawing.

DETAILED DESCRIPTION

Figure 1:
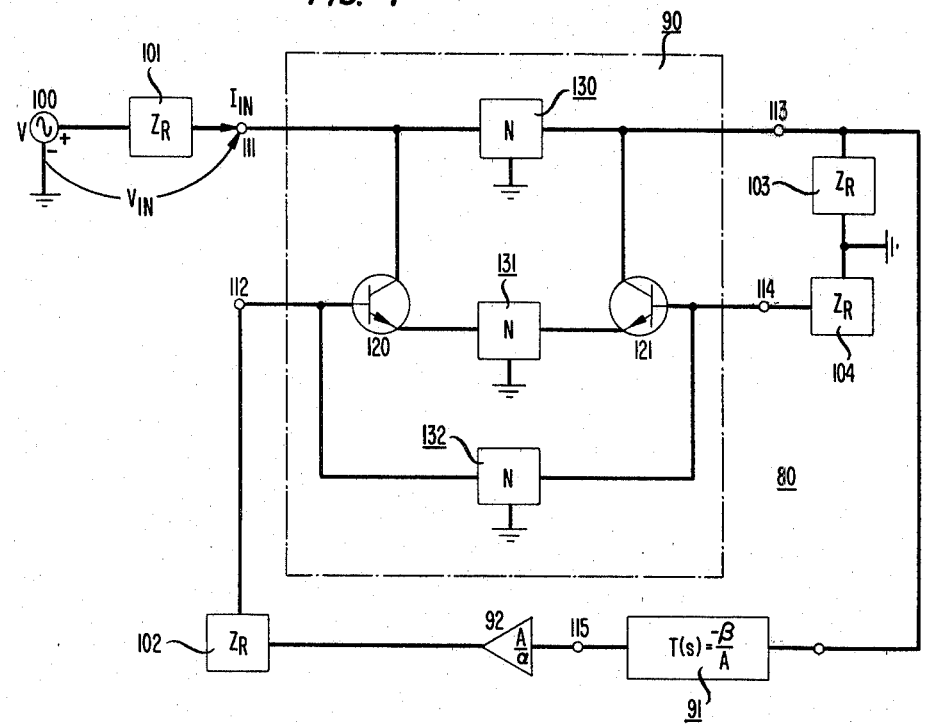
FIG. 1 is a diagram, partly in schematic form and partially in block form, depicting one embodiment of a balancing network in accordance with the present invention.

In FIG. 1 there is shown an illustrative embodiment of circuitry 80 utilized to provide a driving point impedance from an amplified transfer impedance. In particular, circuitry 80 comprises: (1) directional coupler 90, which includes two active elements 120 and 121 and three identical networks 130, 131, and 132, labeled N; and (2) a series arrangement of transfer impedance network 91 and amplifier 92 directively connected between transmission port 113 and reflection port 112 of coupler 90.

Figure 2:
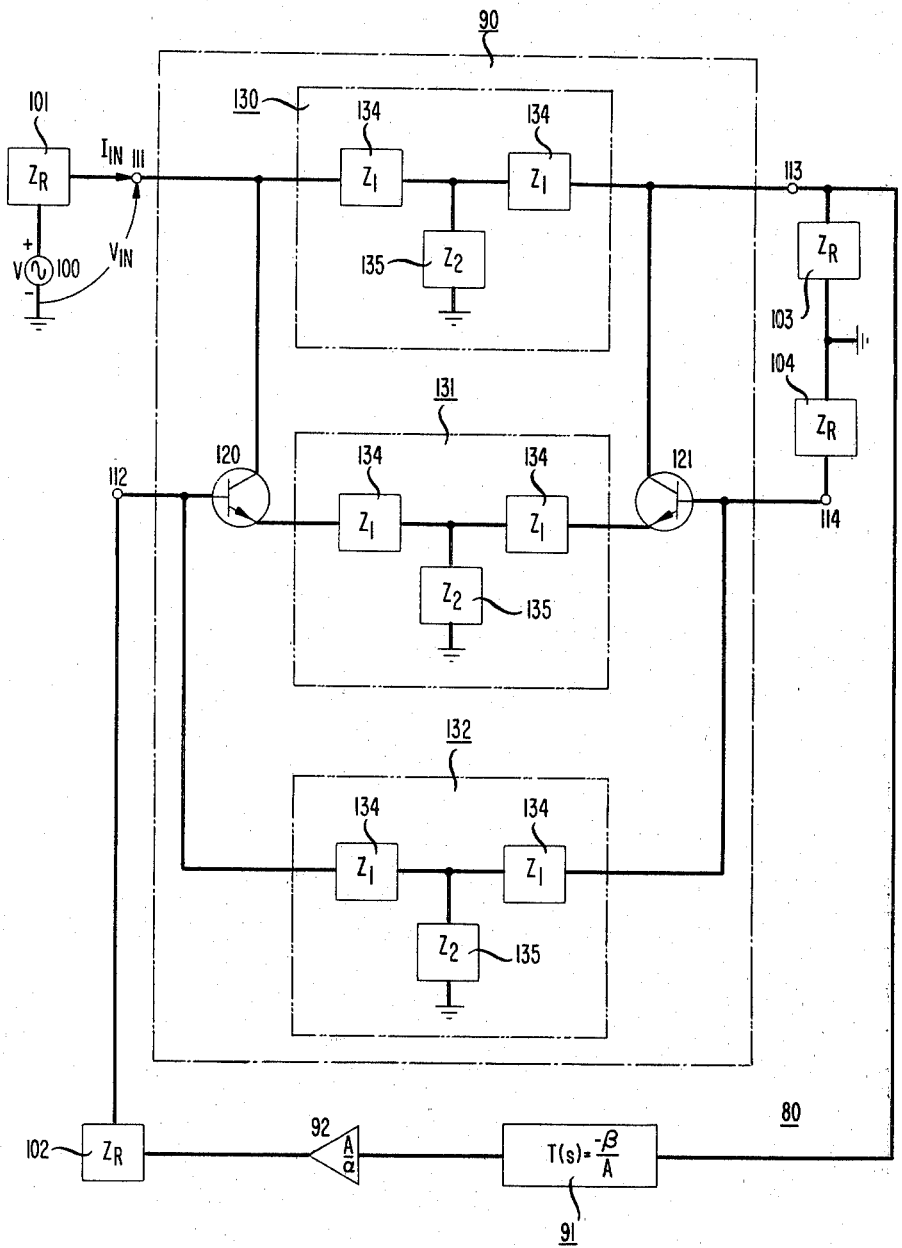
FIG. 2, included for the purpose of illustration, shows a T-network as one type of network utilized for the N network of FIG. 1.

In FIG. 2, T-networks 130–132 are shown as representative of one type of N network. The three identical T-networks 130–132 have series impedances 134 and shunt impedance 135. For purposes of illustration, active elements 120 and 121 are depicted as transistors; it will be recognized, however, that other types of active elements may be readily used. Moreover, networks 130–132 have been depicted by passive T-devices but, as will be indicated later, other networks may be utilized subject to certain constraints to be given. Finally, direct current biasing sources and connections have been omitted so as not to unduly complicate the circuit diagram and description.

As an aid in understanding the theory and motivation underlying the present invention, it is helpful to first consider certain relations from the transmission line art. It is well-established in that art that the input impedance to a transmission line, designated here as $Z_L$, and the characteristic impedance of the line, called $Z_O$, may be combined to yield a quantity designated the complex reflection coefficient $\rho$, wherein $$\rho = (Z_L - Z_O)/(Z_L + Z_O). \tag{1}$$

(The explicit dependency of $\rho$, $Z_L$ and $Z_O$ on the radian frequency $\omega$ has been suppressed for ease in presentation). The coefficient $\rho$ is a measure of the energy reflected from irregularities along the transmission line at each individual frequency.

Equation (1) may be solved for $Z_L$ to yield $$Z_L = \left(\frac{1+\rho}{1-\rho}\right) Z_O. \tag{2}$$

It is observed from equation (1) that if $Z_L$ and $Z_O$ are known, $\rho$ may be obtained, and once obtained, equation (2) may be employed to synthesize $Z_L$ from $\rho$ and $Z_O$.

The present invention generalizes the formulations normally considered only in the transmission line context. In particular, the relation of equation (1) may be generalized for any one-part network as defined by the following relation:

$$\beta = \frac{Z_{in} - Z_R}{Z_{in} + Z_R}, \tag{3}$$

where
$\beta$ is a complex network coefficient,
$Z_{in}$ is the input impedance at the port, and
$Z_R$ is an arbitrary reference impedance.

In addition, a relation analogous to equation (2) may be derived:

$$Z_{in} = \left(\frac{1+\beta}{1-\beta}\right) Z_R. \tag{4}$$

Thus, once the $Z_{in}$ to be provided by the network is known and $Z_R$ is selected, $\beta$ may be derived from equation (3). Then, rather than directly synthesizing $Z_{in}$, $\beta$ is the quantity synthesized. The utility in this approach is dependent upon: (i) deriving an inherently stable circuit that is described by equation (4) and (ii) providing $\beta$ as the transfer ratio of a two-port network. A transfer impedance synthesis affords increased versatility since the parameters controlling pole-zero locations are effectively independent. Moreover, certain elements in the transfer network may be made small since the transfer function may be amplified to increase the effect provided by the element values.

The objective of the following analysis is to demonstrate that the ratio of the voltage ($V_{in}$) appearing at port 111 in FIG. 2 to the current ($I_{in}$) flowing into port 111 due to voltage source 100 yields the desired impedance $Z_{in} = V_{in}/I_{in}$ in the form of equation (4).

Figure 3:
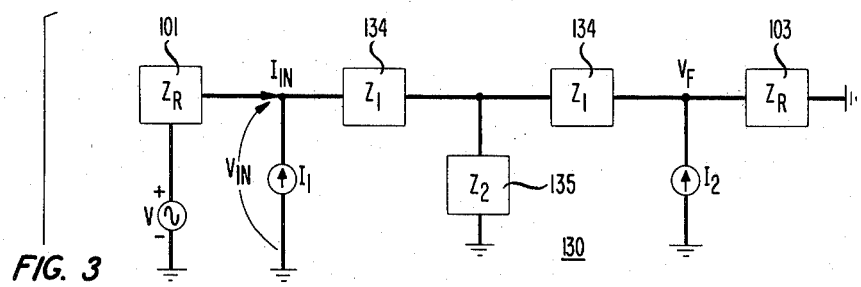
FIG. 3, included for the purpose of explanation, depicts an equivalent circuit of the network shown in FIG. 2.

If it is assumed for the purposes of this analysis that both transistors 120 and 121 have extremely large base impedance relative to the input impedance of network 132, and the emitter and collector currents are equal (both assumptions are satisfied for $\alpha \approx 1$), then a model representative of FIG. 2 is shown in FIG. 3.

The networks 130, 131 and 132 have the same transfer characteristics and are matched with respect to the arbitrary impedance level $Z_R$. Being matched two-ports, they can be characterized by a bisected symmetric impedance $Z_S = Z_1 + 2Z_2$ and a bisected antisymmetric impedance $Z_A = Z_1$, where $$\frac{Z_S}{Z_R} = \frac{Z_R}{Z_A} \tag{5}$$

or $$Z_S Z_A = (Z_1 + 2Z_2)Z_1 = Z_R^2. \tag{6}$$

Thus, any two-port network satisfying the equation (5) and having input-to-output coupling may be employed as networks 130–132. The particular T-network shown satisfies the requisite level of generality to demonstrate the principles of this invention and is therefore employed for the analysis.

With suitable circuit analysis techniques, it is easily demonstrated for the lower circuit portion of FIG. 3 that $$E_1 = \frac{Z_R Z_2 E}{(Z_R + Z_1)^2} \tag{7}$$

-continued and $$E_2 = \frac{Z_1(Z_R + Z_1 + Z_2)E}{(Z_R + Z_1)^2}. \tag{8}$$

Furthermore, it may be shown that $$I_1 = E_1/Z_R \tag{9}$$

and $$I_2 = -E_2/Z_R. \tag{10}$$

Finally, analysis of the upper circuit portion yields $$Z_{in} = \frac{1 - \frac{\beta}{\alpha} \frac{Z_R Z_1 Z_2}{(Z_R + Z_1)^2(Z_R + Z_1 + Z_2)}}{1 + \frac{\beta}{\alpha} \frac{Z_R Z_1 Z_2}{(Z_R + Z_1)^2(Z_R + Z_1 + Z_2)}} Z_R. \tag{11}$$

If $\alpha$ the multiplicative gain constant, is defined as $$\alpha = \frac{Z_R Z_1 Z_2}{(Z_R + Z_1)^2(Z_R + Z_1 + Z_2)}, \tag{12}$$

then equation (11) reduces to equation (4).

Now that it has been demonstrated that circuit 80 of FIG. 2 has the form required to satisfy equation (4), one final consideration remains to be developed. This consideration is two-fold and relates to: (i) the generation of the expression for $\beta$ from the desired input impedance, as per equation (3); and (ii) the synthesis of the appropriate network 91 to represent $\beta$. In this regard, the following example is presented as being indicative of the generalized procedure for generating and synthesizing $\beta$ for an arbitrary balancing network.

If the input impedance is chosen to be a simple capacitance C and the reference impedance is a simple resistance R, then from equation (3)

$$\beta = \frac{\frac{1}{sC} - R}{\frac{1}{sC} + R} = -1 + \frac{2}{1 + s\tau} \tag{13}$$

where s is the complex frequency domain variable and $\tau = RC$.

Equation (13) may be manipulated to yield a form more suitable for synthesis using admittance-type transfer functions; this form is $$\beta = 1 - 2\left(\frac{s}{s + 1/\tau}\right) \tag{14}$$

Equation (14) is a specific form of the more general expression $$A_o + \sum_i \frac{A_{1i}s}{s + A_{2i}} - B_o - \sum_i \frac{B_{1i}s}{s + B_{2i}} \tag{15}$$

where the A and B quantities are positive. Equation (15) may be employed to synthesize the impedance characteristic of any subscriber loop or arbitrary balancing network including distributed systems.

Figure 4:
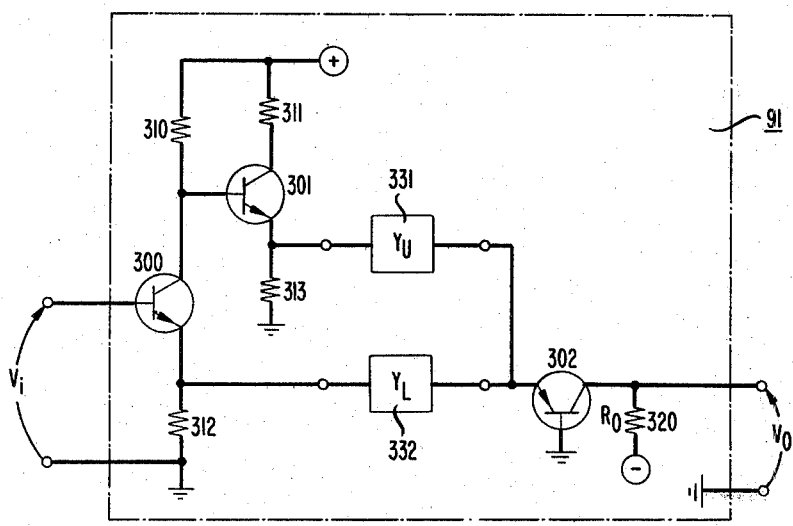
FIG. 4 is a schematic diagram of one form of the transfer signal network T of FIG. 1.
Figure 5:
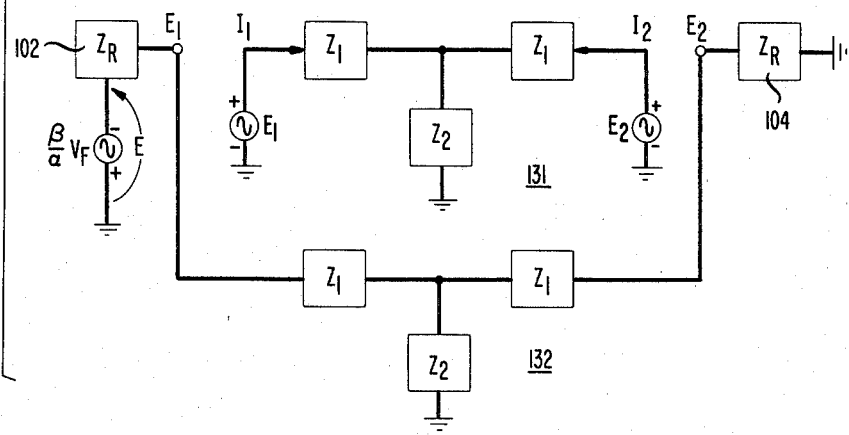
FIG. 5 is a circuit diagram representative of the general network utilized for admittances $Y_U$ and $Y_L$ of FIG. 4.
Figure 5:
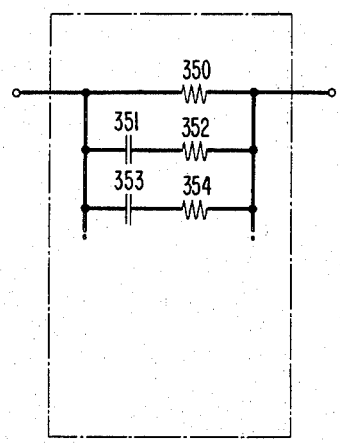

The circuits shown in FIGS. 4 and 5 may be combined to yield a transfer function characteristic in the form of equation (15). In FIG. 4, emitter follower 300 presents a high impedance input to the signal represented by $V_i$ and a low impedance output across emitter resistor 312 to drive network 332. Similarly, emitter follower 301, by coupling the collector of transistor 300 to the base of transistor 301, presents a high impedance load to transistor 301 and a low impedance drive circuit to network 331 via emitter resistor 313. The voltages developed across resistors 312 and 313 correspond to $V_i$ and $-V_i$, respectively. Since the emitter of transistor 302 is effectively at AC ground, and the AC collector current essentially equals the emitter current, the ratio of the output voltage $V_o$ developed across resistor 320 ($R_o$) to the input voltage $V_i$ is given by:

$$\frac{V_o}{V_i} = -R_o(-Y_U + Y_L), \tag{16}$$

where $Y_U$ and $Y_L$, are the admittances of the one-port networks 331 and 332, respectively. If $Y_U$ and $Y_L$ have the form represented by the one-port of FIG. 5, then the ratio $V_o/V_i$ in equation (16) has the same form as equation (15).

Figure 6:
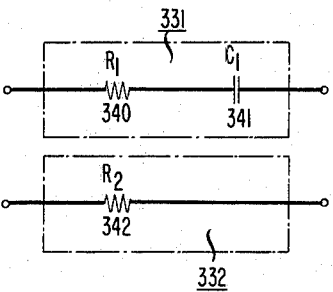
FIG. 6 are specialized circuits for $Y_U$ and $Y_L$ to synthesize a capacitive input impedance for the case of A=1 in FIG. 1.

Returning to the specific example wherein $Z_{in} = 1/(sC)$, and utilizing for $Y_U$ and $Y_L$ the special versions of FIG. 5 shown in FIG. 6, equation (16) reduces to:

$$\frac{V_o}{V_i} = -R_o\left[\frac{-(1/R_1)s}{s + 1/(R_1C_1)} + \frac{1}{R_2}\right]. \tag{17}$$

Assuming for the moment that the amplifier gain constant A (see FIG. 1) is one, and by combining equations (14) and (17) to satisfy the requirement that $T = -\beta/A = V_o/V_i$, then $$1 - 2\left(\frac{s}{s + 1/\tau}\right) = \frac{R_o}{R_2} - \frac{(R_o/R_1)s}{s + 1/(R_1C_1)}. \tag{18}$$

Equation (18) is satisfied if $R_2 = R_o$, $R_1 = R_o/2$ and $\tau = R_1C_1$ so $C_1 = \tau/R_1$.

If the gain constant A is different from one, the following obtains:

$$1 - 2\left(\frac{s}{s + 1/\tau}\right) = \frac{AR_o}{R_2} - \frac{((AR_o)/R_1)s}{s + 1/(R_1C_1)}. \tag{19}$$

For a fixed $R_o$, equation (19) is satisfied by $R_2 = AR_o$, $R_1 = AR_o/2$ and $\tau = R_1C_1$. Since $R_1$ is A times larger than before, to maintain the same time constant $\tau$, $C_1$ must be decreased by A. Thus, a more interpretative expression for $\tau$ becomes $\tau = (AR_1)(C_1/A)$. The networks to be substituted for $Y_U$ and $Y_L$ in FIG. 4 to achieve the result for an arbitrary gain A are shown in FIG. 7.

Figure 7:
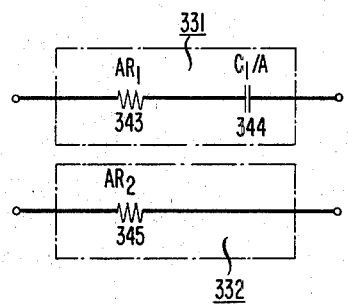
FIG. 7 are specialized circuits for $Y_U$ and $Y_L$ of FIG. 4 to synthesize a capacitive input impedance for arbitrary gain constant A.

Comparison of the element values in FIGS. 6 and 7 for this simple example indicates the theory underlying the amplified transfer function approach. With this approach, resistor values are increased by a scale factor A whereas capacitors are decreased by A. With integrated circuits, it is possible to achieve a wide variation in resistance for a fixed region on the substrate by using different resistivity materials. However, capacitor values are proportional to region size. By scaling down the network capacitors by the factor A capacitor elements may be decreased to the point where integration becomes feasible.

Figure 8:
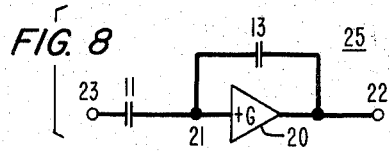
FIG. 8 depicts capacitance magnification circuitry for realizing the capacitors shown in FIGS. 5, 6 and 7.

Moreover, as I have disclosed in my earlier U.S. Pat. No. 4,025,867, additional scaling down of the capacitor values can be achieved using capacitor magnification. This patent discloses that precision operational amplifier circuitry may be employed to magnify the value of a capacitor placed in the feedback path. The capacitance magnification circuitry disclosed in this earlier patent is shown in FIG. 8 as circuit 25. The capacitors shown in FIGS. 5, 6 and 7 may be realized with magnification circuit 25 so as to reduce actual capacitor values needed to synthesize a capacitive input impedance. The subject matter of this earlier patent is hereby incorporated by reference as if it were reproduced herein in its entirety.

Although transfer circuit 91 has been described in terms of a network comprising only analog components, it is apparent that a frequency domain expression such as, for example, the representation of $\beta$ given by equation (3), may be transferred to the time domain. This transformed representation may then be synthesized using, for instance, delay line-type circuits as exemplified by a charge transfer device (CTD). With such a CTD arrangement, the input analog time signal (appearing say, at terminal 113 in FIG. 1) is sampled and this sample as well as past samples are propagated through the CTD. The delayed samples are extracted, weighted by scale factors and then combined to yield a desired sampled output signal at each sample instant. A sampling frequency filter reconstructs the processed signal to provide a continuous analog signal at the output (say terminal 115 in FIG. 1).

Figure 9:
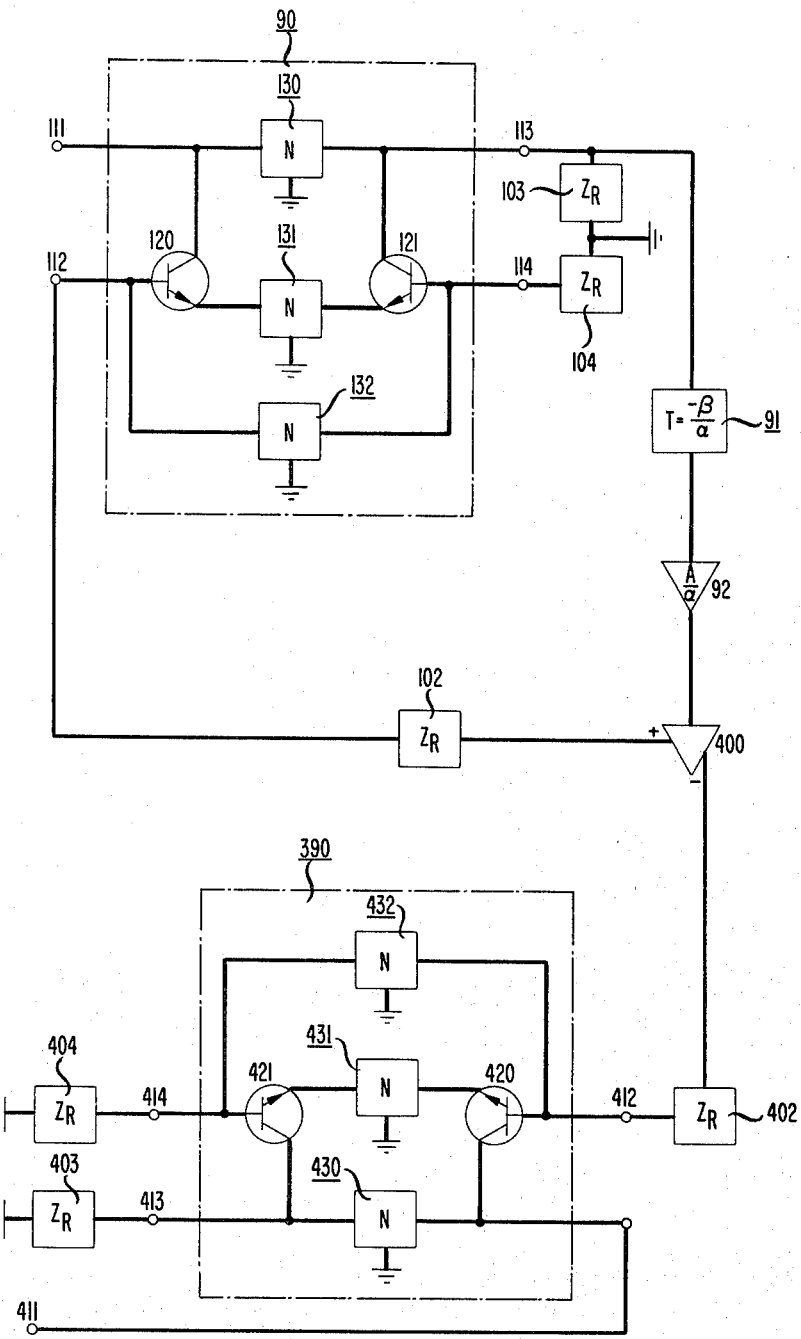
FIG. 9 shows a pair of directional couplers used to produce a driving point impedance balanced with respect to ground.

Finally, FIG. 9 depicts circuitry for providing a balanced driving point impedance across terminal pair 111-411. The elements in FIG. 9 that are identical to the elements in FIG. 1 are labeled with the same indicia. Moreover, element 390 in FIG. 9 is identical to element 90 in FIG. 1, element 430 is identical to element 130, and so forth for all elements having indicia increased by three hundred. To achieve balanced operation, unity gain unbalanced-to-balanced amplifier 400 of FIG. 9 is inserted between amplifier 92 and impedance 102 as they were set forth in FIG. 1. The signal appearing on terminal 412 in FIG. 9 is transmitted through coupler 390 in the same manner the signal on terminal 112 is transmitted through coupler 90.

It will be further understood that the circuitry for converting a transfer function characteristic to a driving point impedance hereindescribed is not limited to specific forms described by way of illustration, but may assume other embodiments limited only by the scope of the appended claims.

I claim:

1. Circuitry including a directional coupler (90) comprising
   two active members (120,121) each having an emitting element, a control element and a collecting element, and
   first, second and third two-port networks (130-132) connected, respectively, between said emitting element, said control element and said collecting element of said members; said networks arranged so that the symmetric mode transfer gain and the antisymmetric mode transfer gain measured between said control elements and said collecting elements, are equal,

CHARACTERIZED BY circuit means (91,92,102), external to said coupler, comprising a transfer signal circuit (91,92) having a transfer ratio of $-\beta$ for coupling said collecting element of one of said members to said control element of the other of said members, and
   impedance networks, each designated $Z_R$, terminating each said collecting element and each said control element,
   said circuitry providing a driving point impedance between said collecting element of said other of said members and the circuitry reference point in the form $Z_{in}=(1+\beta)Z_R/(1-\beta)$ whenever $\beta=(Z_{in}-Z_R)/(Z_{in}+Z_R)$.

2. The circuitry as recited in claim 1 wherein said transfer signal circuit comprises
   a transfer network (91) having transfer function $\pm\beta/A$, and
   an amplifier (92) having gain $\pm A$ in cascade with said transfer network.

3. The circuitry as recited in claim 1 wherein
   said first, second and third networks are T-networks having series impedance $Z_1$, and shunt impedance $Z_2$, and
   said transfer signal circuit comprises
   a transfer network having transfer function $\pm\beta/A$, and
   an amplifier having gain $\pm A/\alpha$, where $$\alpha = \frac{Z_R Z_1 Z_2}{(Z_R + Z_1)^2(Z_R + Z_1 + Z_2)}.$$

4. The circuitry as recited in claim 1 wherein said transfer signal circuit comprises
   wideband input buffer means (300,301) for converting the voltage at the input of said signal circuit to a positive replica and a negative version of said voltage,
   first and second one-port admittance networks (331,332), each having series resistor-capacitor paths connected in parallel, responsive to said positive replica and said negative version, respectively, and
   wideband output buffer means (302) for providing an output voltage proportional to the sum of the currents flowing into said first and second admittance networks.

5. The circuitry as recited in claim 4 wherein
   said first and second admittance networks have representations $Y_L$ and $Y_U$, respectively,
   the voltage transfer ratio of said output voltage to said input voltage is $R_o(Y_U-Y_L)$ so that $\beta=R_o(Y_L-Y_U)$, where $R_o$ (320) is a resistance representing a constant of proportionality.

6. The circuitry as recited in claim 1 wherein said transfer signal circuit comprises
   a transfer network (91) having transfer function $-\beta/A$ and comprising
   wideband input buffer means (300,301) for converting the voltage at the input of said signal circuit to a positive replica and a negative version of said voltage,
   first and second one-port admittance networks (331,332), each having series resistor-capacitor paths connected in parallel, the admittance level of said networks for A different than one being 1/A times the admittance level for A=1, said networks being responsive to said positive replica and negative version, respectively, and wideband output buffer means (302) for providing an output voltage proportional to the sum of the currents flowing into said first and second admittance networks, and an amplifier (92) in cascade with said transfer network having gain A.

7. The circuitry as recited in claim 6 wherein said admittance level is increased by increasing each said resistor in said paths by the factor A and by decreasing each said capacitor in said paths by the factor A over the values of each said resistor and each said capacitor for A=1.

8. The circuitry as recited in claim 7 wherein each said capacitor may be further decreased by realizing each said capacitor with a capacitor magnification circuit (20).

9. Circuitry comprising a first directional coupler (90) and a second directional coupler (390), said first coupler having an input port (111), a transmission port (113) and a reflection port (112), said second coupler having an input port (411), a transmission port (413) and a reflection port (412), each said coupler including two active members (e.g., 120,121) each having an emitting element, a control element and a collecting element, and first, second and third two-port networks (e.g., 130-132) connected, respectively, between said emitting element, said control element and said collecting element of said members, said networks arranged so that the symmetric mode transfer gain and the antisymmetric mode transfer gain, measured between said control elements and said collecting elements, are equal, said circuitry further

CHARACTERIZED BY unbalanced-to-balanced unity gain coupling means (400), the positive output of said coupling means being connected to said reflection port of said first coupler and the negative output of said coupling means being connected to said reflection port of said second coupler, and circuit means (91,92), external to said first coupler and said second coupler comprising a transfer signal circuit (91,92) having a transfer ratio of $-\beta$, for connecting said transmission port of said first coupler to the input of said coupling means to provide a preselected, balanced driving point impedance across said input port of said first coupler and said input port of said second coupler.

10. The circuitry as recited in claim 9 further comprising impedance networks, each designated $Z_R$, terminating each said collecting element and each said control element to provide said balanced driving point impedance of the form $(1+\beta)Z_R/(1-\beta)$.

11. The circuitry as recited in claim 10 wherein said transfer signal circuit comprises a transfer network (91) having transfer function $\pm\beta/A$, and an amplifier (92) having gain $\pm A$ in cascade with said transfer network.

* * * * *

UNITED STATES PATENT AND TRADEMARK OFFICE
CERTIFICATE OF CORRECTION

PATENT NO. : 4,395,599
DATED : July 26, 1983
INVENTOR(S) : Harold Seidel

It is certified that error appears in the above-identified patent and that said Letters Patent is hereby corrected as shown below:

Column 4, line 1, "one-part" should read --one-port--; line 55, "$Z_R^2.$" should read --$Z_R^2.$--. Column 5, line 46, that portion of the equation reading "1+st" should read --$1+s\tau$--; line 56, that portion of the equation reading "1/t" should read --$1/\tau$--.
Column 7, line 24, "transferred" should read --transformed--.
Column 8, line 21, "$\pm A$" should read --$\mp A$--; line 28, "$\pm\beta/A$" should read --$\mp\beta/A$--; line 30, "$\pm A/\alpha$" should read --$\mp A/\alpha$--.
Column 10, line 29, "$\pm\beta/A$" should read --$\mp\beta/A$--.

Signed and Sealed this

First Day of November 1983

[SEAL]

Attest:

Attesting Officer

GERALD J. MOSSINGHOFF

Commissioner of Patents and Trademarks